US011161599B2

(12) United States Patent
Johnson et al.

(10) Patent No.: US 11,161,599 B2
(45) Date of Patent: Nov. 2, 2021

(54) LANDING GEAR STRUT ASSEMBLY AND METHOD THEREFOR

(71) Applicant: The Boeing Company, Chicago, IL (US)

(72) Inventors: Michael Patterson Johnson, Torrance, CA (US); Allyn Dalton Morris, Woodinville, WA (US); Ricardo Mendes Da Silva, Snohomish, WA (US); Gary M. Lindahl, Newcastle, WA (US)

(73) Assignee: The Boeing Company, Chicago, IL (US)

( * ) Notice: Subject to any disclaimer, the term of this patent is extended or adjusted under 35 U.S.C. 154(b) by 472 days.

(21) Appl. No.: 15/880,858

(22) Filed: Jan. 26, 2018

(65) Prior Publication Data

US 2019/0233091 A1 Aug. 1, 2019

(51) Int. Cl.
*B64C 25/26* (2006.01)
*B64C 25/34* (2006.01)
(Continued)

(52) U.S. Cl.
CPC .............. *B64C 25/26* (2013.01); *B64C 25/34* (2013.01); *B64C 25/58* (2013.01); *B64C 2025/125* (2013.01)

(58) Field of Classification Search
CPC ......... B64C 25/26; B64C 25/58; B64C 25/34; B64C 25/30; B64C 2025/125; B64C 25/28
See application file for complete search history.

(56) References Cited

U.S. PATENT DOCUMENTS

| 2,256,540 A | 9/1941 | Armstrong |
| 2,420,066 A * | 5/1947 | Hugh ...................... B64C 25/28 244/183 |

(Continued)

FOREIGN PATENT DOCUMENTS

| EP | 0246949 | 11/1987 |
| EP | 2138398 | 12/2009 |

(Continued)

OTHER PUBLICATIONS

European Search Report, European Application No. 19152374, dated May 15, 2019.

(Continued)

*Primary Examiner* — Christopher D Hutchens
(74) *Attorney, Agent, or Firm* — Perman & Green, LLP

(57) ABSTRACT

A landing gear strut assembly including an outer cylinder, an inner cylinder, and a latch mechanism including a first mounting bracket coupled to the outer cylinder, a second mounting bracket coupled to the inner cylinder, a first latching member pivotally coupled to the first mounting bracket, the first latching member having a latching position and a released position, and a second latching member coupled to the second mounting bracket, wherein in the latching position the first latching member is positioned relative to the second latching member so as to couple with the second latching member and retain the inner cylinder in a retracted position, and wherein in the released position the first latching member is uncoupled from the second latching member so that the inner cylinder is free to move relative to the outer cylinder in the direction of extension of the inner cylinder.

20 Claims, 13 Drawing Sheets

(51) Int. Cl.
*B64C 25/58* (2006.01)
*B64C 25/12* (2006.01)

(56) References Cited

U.S. PATENT DOCUMENTS

| | | | |
|---|---|---|---|
| 2,754,072 | A | 7/1956 | Shapiro |
| 2,933,271 | A | 4/1960 | Maltby |
| 2,967,682 | A | 1/1961 | Fullam et al. |
| 4,540,142 | A | 9/1985 | Veaux et al. |
| 4,749,152 | A | 6/1988 | Veaux et al. |
| 5,100,083 | A | 3/1992 | Large et al. |
| 5,299,761 | A | 4/1994 | Robin et al. |
| 5,429,323 | A | 7/1995 | Derrien et al. |
| 5,460,340 | A | 10/1995 | White |
| 5,482,228 | A | 1/1996 | Hoshino |
| 6,182,925 | B1 | 2/2001 | Kilner et al. |
| 8,376,272 | B2 | 2/2013 | Bennett et al. |
| 8,448,900 | B2 | 5/2013 | Mellor et al. |
| 8,991,753 | B2 | 3/2015 | Mellor et al. |
| 8,998,133 | B2 | 4/2015 | Cottet |
| 9,481,452 | B2 | 11/2016 | Lindahl et al. |
| 9,499,280 | B2 | 11/2016 | Mellor |
| 10,384,767 | B2 | 8/2019 | Cottet et al. |
| 10,766,608 | B2 | 9/2020 | Mellor et al. |
| 10,800,516 | B2 | 10/2020 | Dahl et al. |
| 2009/0050736 | A1 | 2/2009 | Bennet et al. |
| 2009/0321560 | A1 | 12/2009 | Luce et al. |
| 2010/0116930 | A1 | 5/2010 | Griffin |
| 2010/0181423 | A1 | 7/2010 | Martin et al. |
| 2010/0219290 | A1 | 9/2010 | Luce |
| 2010/0288878 | A1 | 11/2010 | Bennett |
| 2011/0233327 | A1 | 9/2011 | Mellor et al. |
| 2013/0341457 | A1 | 12/2013 | Wilson |
| 2017/0253323 | A1 | 9/2017 | Green et al. |
| 2018/0001998 | A1 | 1/2018 | Bennett |
| 2018/0162522 | A1* | 6/2018 | Luce .................. B64C 25/22 |
| 2018/0208298 | A1 | 7/2018 | Cottet et al. |
| 2019/0039723 | A1 | 2/2019 | Dubrovsky et al. |
| 2019/0185147 | A1* | 6/2019 | Luce .................. B64C 25/26 |

FOREIGN PATENT DOCUMENTS

| | | |
|---|---|---|
| EP | 2489591 | 8/2012 |
| EP | 3213992 | 9/2017 |
| EP | 3335988 | 6/2018 |
| EP | 3437990 | 2/2019 |
| GB | 484938 | 5/1938 |
| GB | 610698 | 10/1948 |
| GB | 670889 | 4/1952 |
| GB | 1216732 | 12/1970 |
| GB | 2137147 | 10/1984 |
| JP | 08338045 | 12/1996 |
| JP | 2011504829 | 2/2011 |
| JP | 2012111479 | 6/2012 |
| WO | 2006094145 | 9/2006 |
| WO | 2009047367 | 4/2009 |
| WO | 2011119283 | 9/2011 |

OTHER PUBLICATIONS

Simpson, et. al; U.S. Appl. No. 15/445,836, filed Feb. 28, 2017; Aircraft Landing Gear, Aircraft, and Related Methods.
Simpson, et. al; U.S. Appl. No. 15/445,652, filed Feb. 28, 2017; Aircraft Landing Gear, Aircraft, and Related Methods.
Mellor, et. al; U.S. Appl. No. 15/444,986, filed Feb. 28, 2017; Aircraft Landing Gear, Aircraft, and Related Methods.
Cusworth, et. al; U.S. Appl. No. 15/490,440, filed Apr. 18, 2017; Aircraft Landing Gear Assembly and Method of Assembling the Same.
Cottet, et. al; U.S. Appl. No. 15/415,346, filed Jan. 25, 2017; Single Axle, Semi-Levered Landing Gear With Shortening Mechanism.
Mellor, et. al; U.S. Appl. No. 15/484,646, filed Apr. 11, 2017; Levered Landing Gear With Inner Shock Strut.
European Search Report, European U.S. Appl. No. 19/188,563, dated Dec. 16, 2019.
European Search Report, European Application No. 18173205 dated Jul. 18, 2018.
European Search Report, European Application No. 18155880 dated Jul. 26, 2018.
Japanese Office Action, Japanese Application No. 2018021945 dated Apr. 1, 2019.
Torsion Sway Bar; dated Apr. 1, 2021; https://carlisuspension.com/product/dodge/dodge-ram-2500-3500/ram-components/13-18-3500-components/torsion-sway-bar/.
CE-9900XJF—XJ/MJ Antirock Front Sway Bar Kit; dated Apr. 1, 2021; https://www.rockjock4x4.com/CE-9900XJF.
European Search Report, European Application No. 18173205.8, dated Mar. 18, 2021.

* cited by examiner

LANDING GEAR STRUT ASSEMBLY AND METHOD THEREFOR

BACKGROUND

1. Field

The exemplary embodiments generally relate to aircraft landing gear and in particular to latch mechanisms for telescopic landing gear.

2. Brief Description of Related Developments

Some aircraft utilize telescopic landing gear to provide, e.g., increased (compared to non-telescopic landing gear having the same retracted length) ground clearance for taxiing where a length of the telescopic landing gear can be decreased for stowage of the landing gear within the wheel well of the aircraft. The telescopic landing gear may also provide for greater angle of rotation of the aircraft at take-off and/or landing.

Telescopic landing gear may be used in conventional aircraft to combat the costs of reconfiguring an aircraft's wheel well to incorporate taller landing gear. The length of the telescopic landing gear will shorten when the landing gear is retracted for stowing the landing gear (i.e., the landing gear shortens to fit the existing wheel well) and the landing gear will extend (i.e., its length will increase) when deployed for ground maneuvering (e.g., take-off, landing, taxiing, etc.) to take advantage of a taller landing gear.

Generally, to extend (e.g., lengthen) and retract (e.g., shorten) the telescoping landing gear, some actuating mechanism is included in the landing gear. Such actuation mechanisms include hydraulic actuation where the hydraulic pressure, such as acting on the landing gear strut, maintains the landing gear in a shrunken configuration within the wheel well of the aircraft. A loss/decrease in hydraulic pressure may result in unwanted extension of the landing gear.

SUMMARY

Accordingly, apparatuses and methods, intended to address at least the above-identified concerns, would find utility.

The following is a non-exhaustive list of examples, which may or may not be claimed, of the subject matter according to the present disclosure.

One example of the subject matter according to the present disclosure relates to a landing gear strut assembly including a first mounting bracket coupled to an outer cylinder of the landing gear strut assembly, a second mounting bracket coupled to an inner cylinder that reciprocates within the outer cylinder, a first latching member pivotally coupled to the first mounting bracket, the first latching member having a latching position and a released position, and a second latching member coupled to the second mounting bracket, wherein the latching position the first latching member is positioned relative to the second latching member so as to couple with the second latching member and retain the inner cylinder in a retracted position, relative to the outer cylinder, in a direction of extension of the inner cylinder, and wherein the released position the first latching member is uncoupled from the second latching member so that the inner cylinder is free to move relative to the outer cylinder in the direction of extension of the inner cylinder.

Another example of the subject matter according to the present disclosure relates to an aircraft including a landing gear strut assembly having a first mounting bracket coupled to an outer cylinder of the landing gear strut assembly, a second mounting bracket coupled to an inner cylinder that reciprocates within the outer cylinder, a first latching member pivotally coupled to the first mounting bracket, the first latching member having a latching position and a released position, and a second latching member coupled to the second mounting bracket, wherein the latching position the first latching member is positioned relative to the second latching member so as to couple with the second latching member and retain the inner cylinder in a retracted position, relative to the outer cylinder, in a direction of extension of the inner cylinder, and wherein the released position the first latching member is uncoupled from the second latching member so that the inner cylinder is free to move relative to the outer cylinder in the direction of extension of the inner cylinder.

Still another example of the subject matter according to the present disclosure relates to a method of retaining a telescoping landing gear that includes an outer cylinder and an inner cylinder that reciprocates within the outer cylinder, the method including positioning a first latching member in a latching position relative to a second latching member so as to couple with the second latching member and retain extension of the inner cylinder relative to the outer cylinder upon abnormal actuation of the telescoping landing gear, where the first latching member is pivotally coupled to the outer cylinder and the second latching member is coupled to the inner cylinder, and positioning the first latching member in a released position upon extension of the telescoping landing gear from a wheel well of an aircraft, where in the released position the first latching member is uncoupled from the second latching member so that the inner cylinder is free to move relative to the outer cylinder in a direction of extension and retraction of the telescoping landing gear.

BRIEF DESCRIPTION OF THE DRAWINGS

Figure 1:
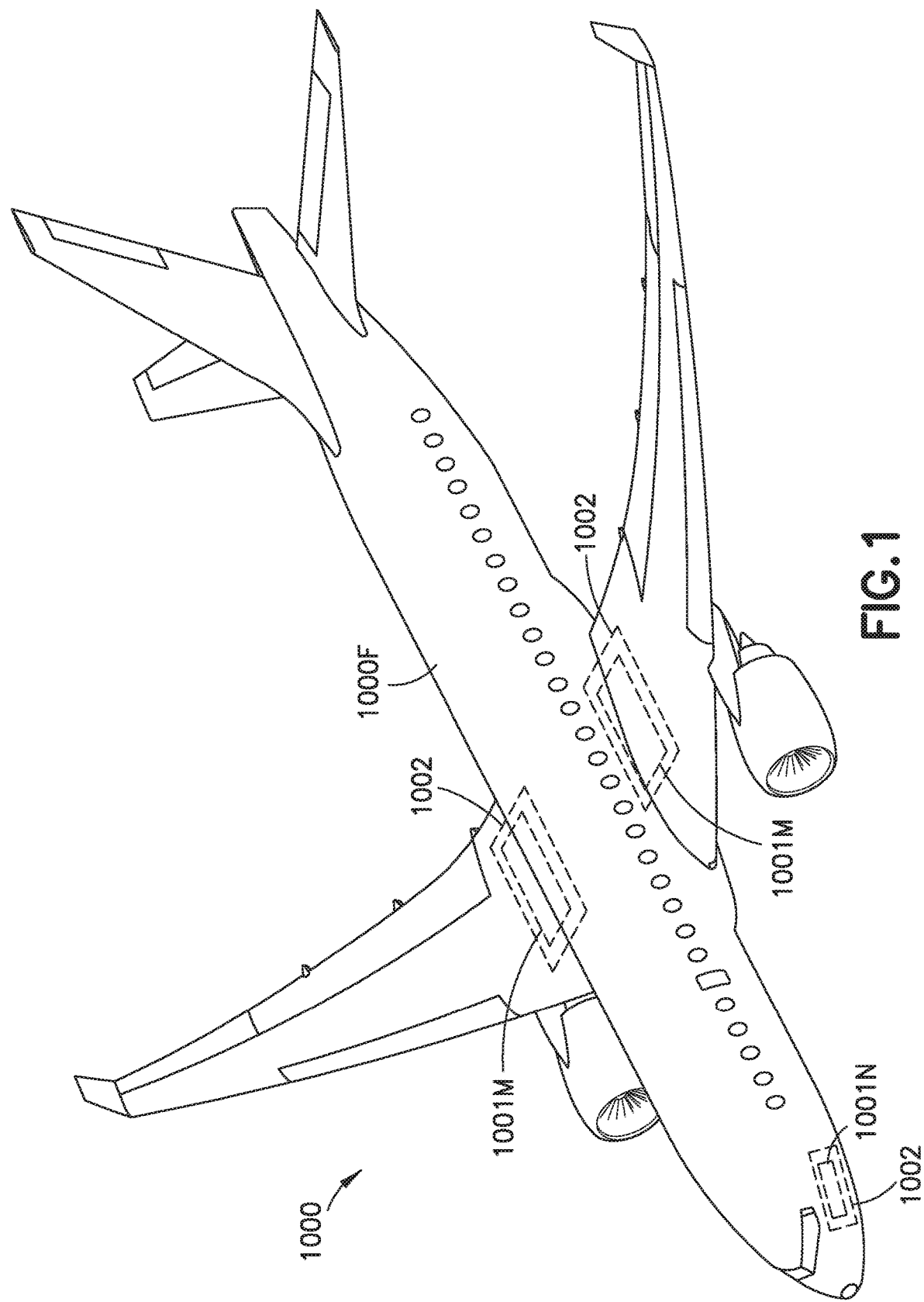
Figure 2:
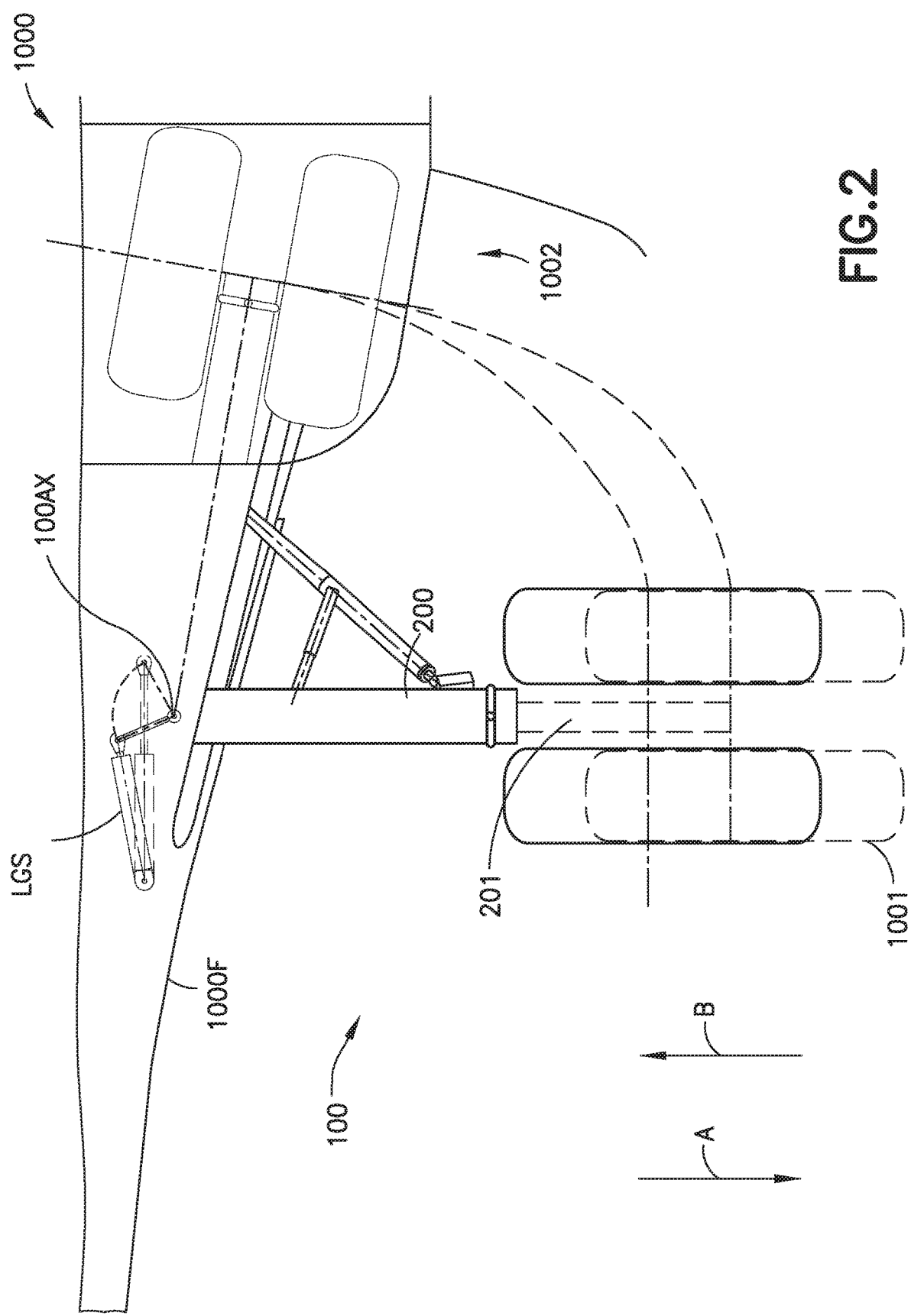
Figure 3:
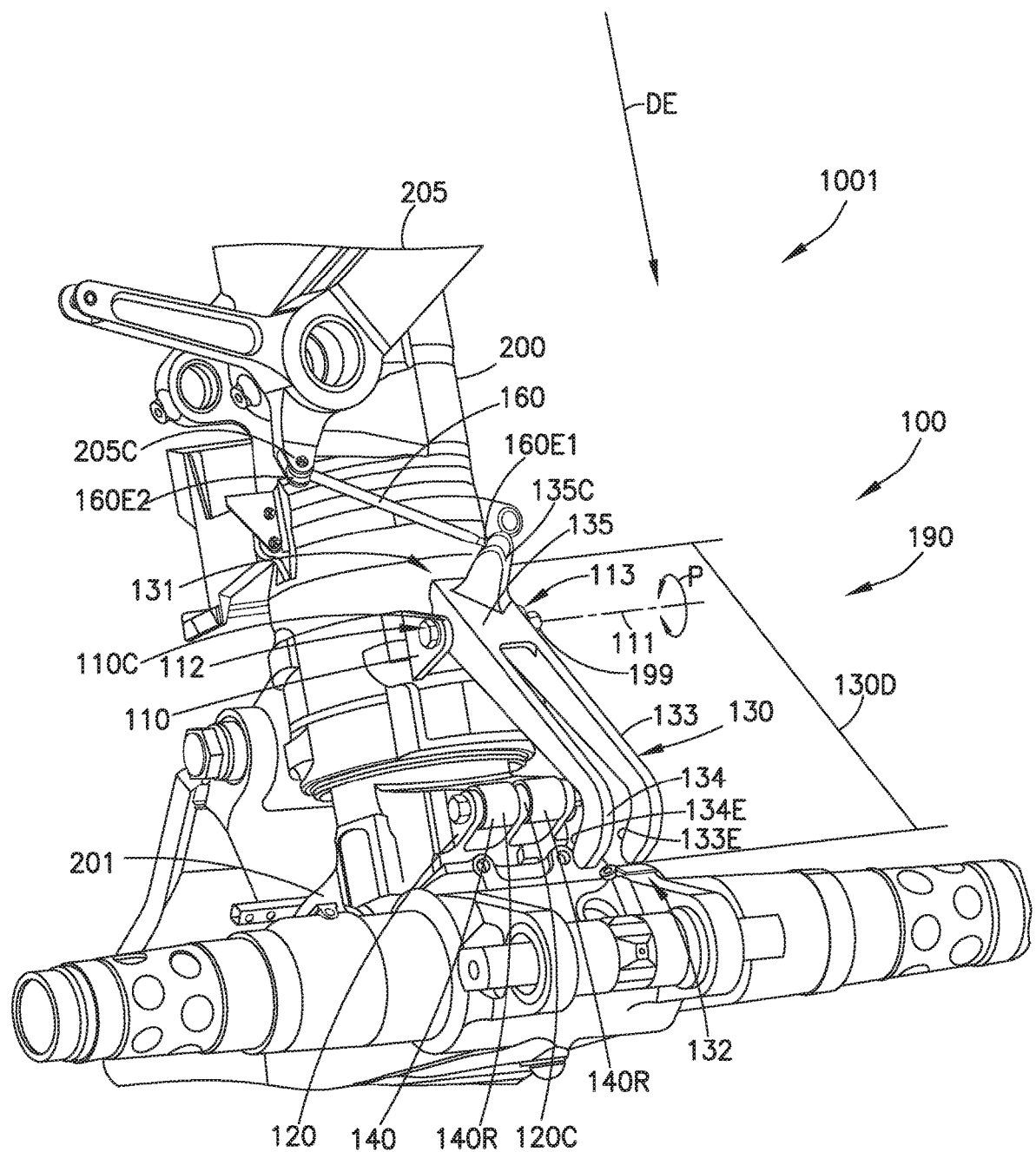
Figure 4A:
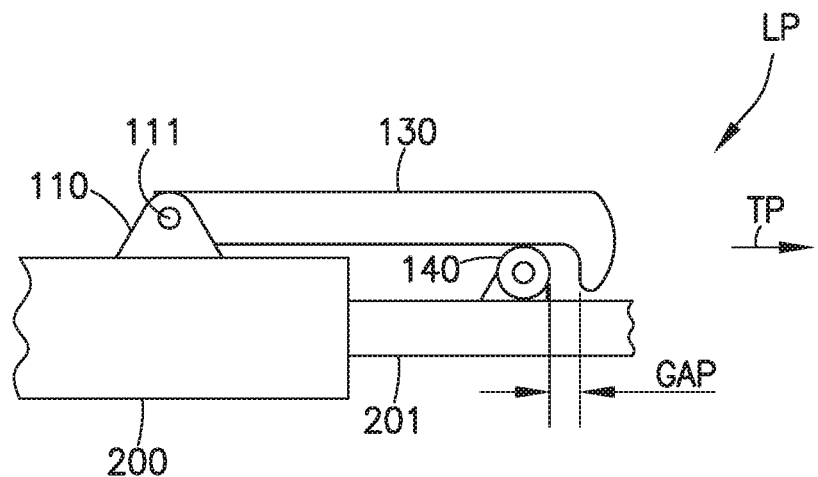
Figure 4B:
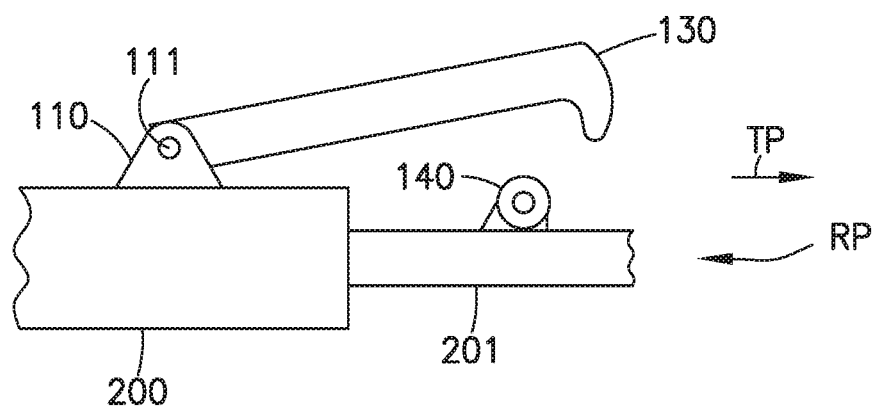
Figure 5:
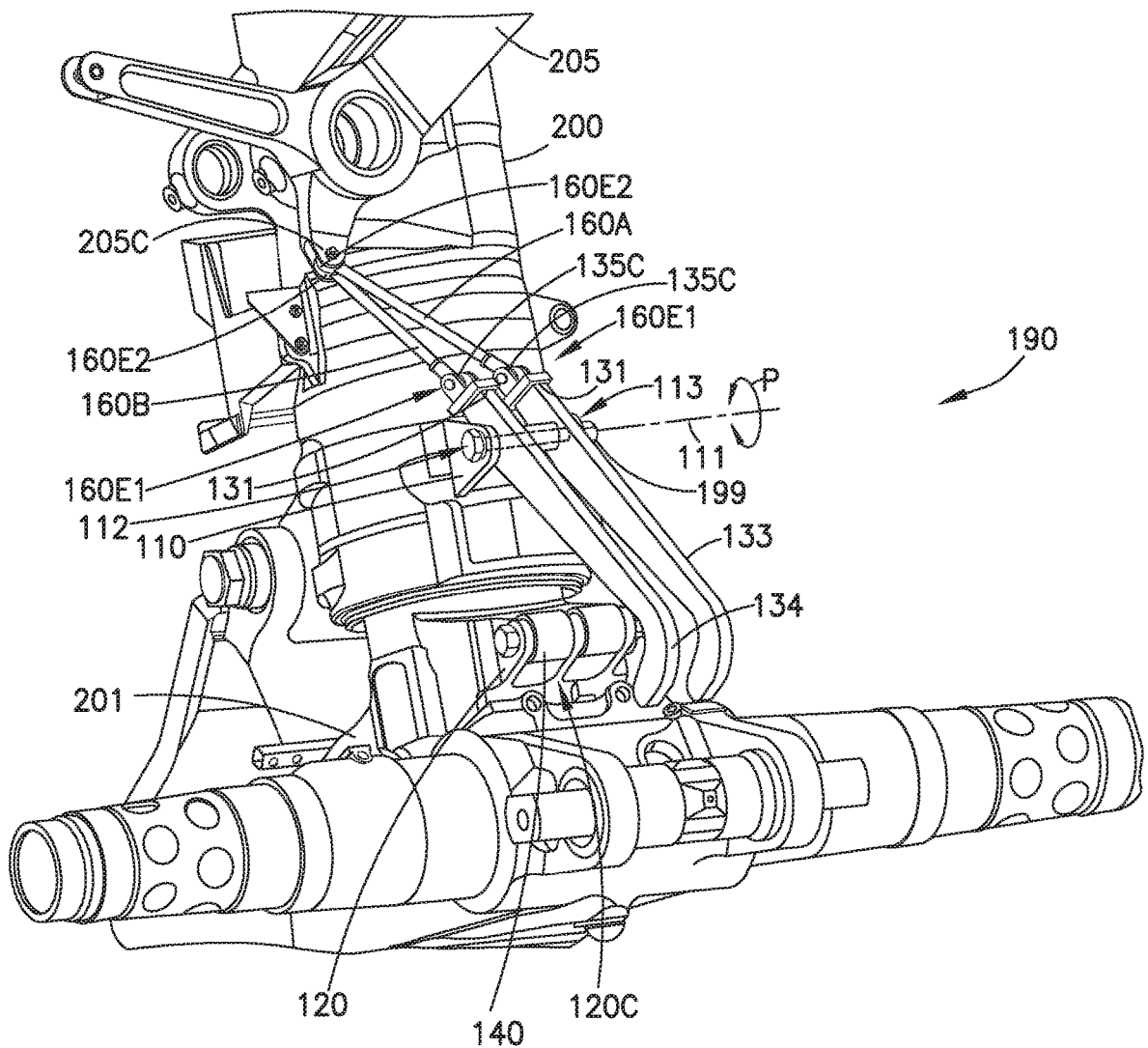
Figure 6:
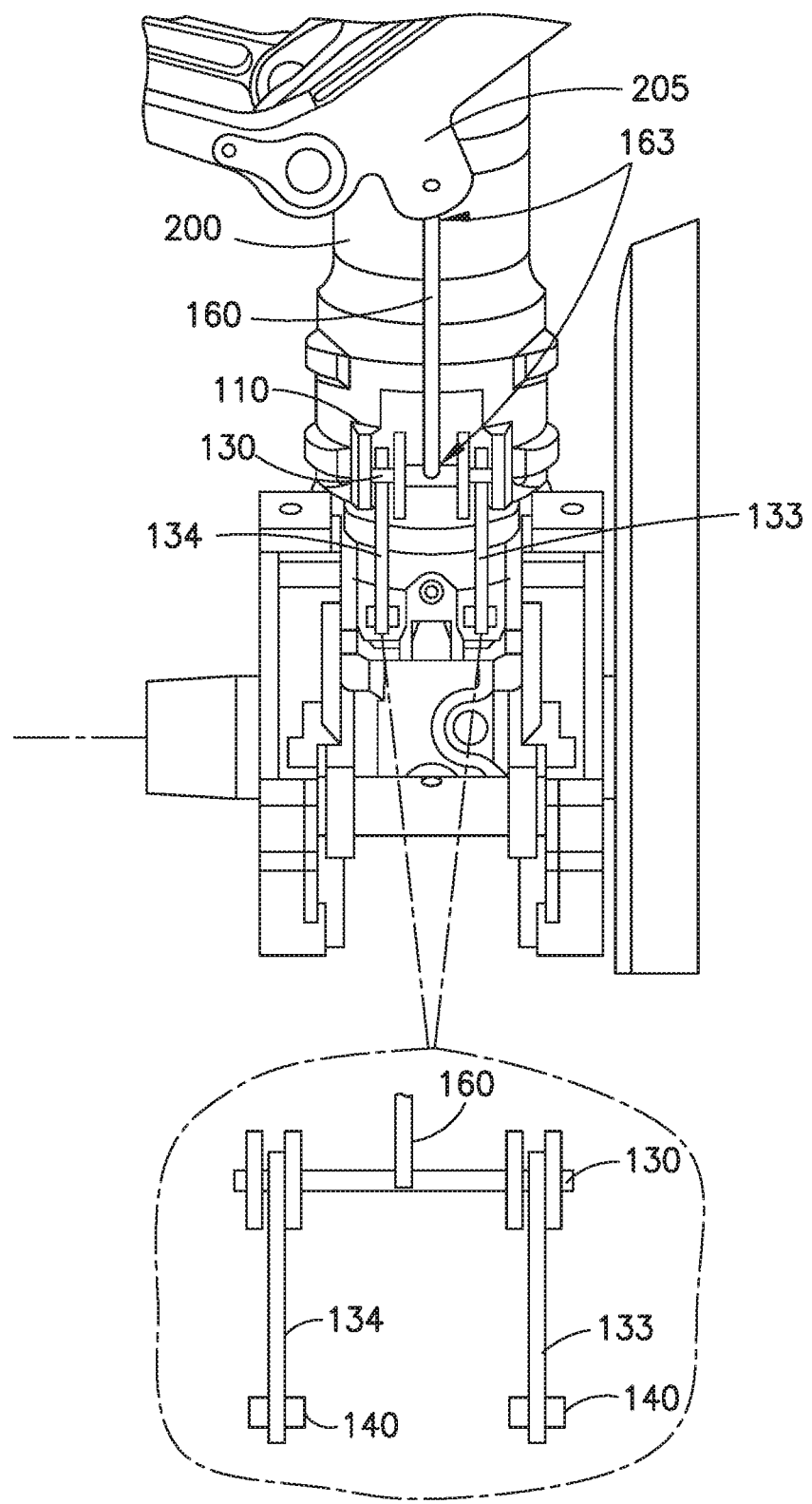
Figure 7:
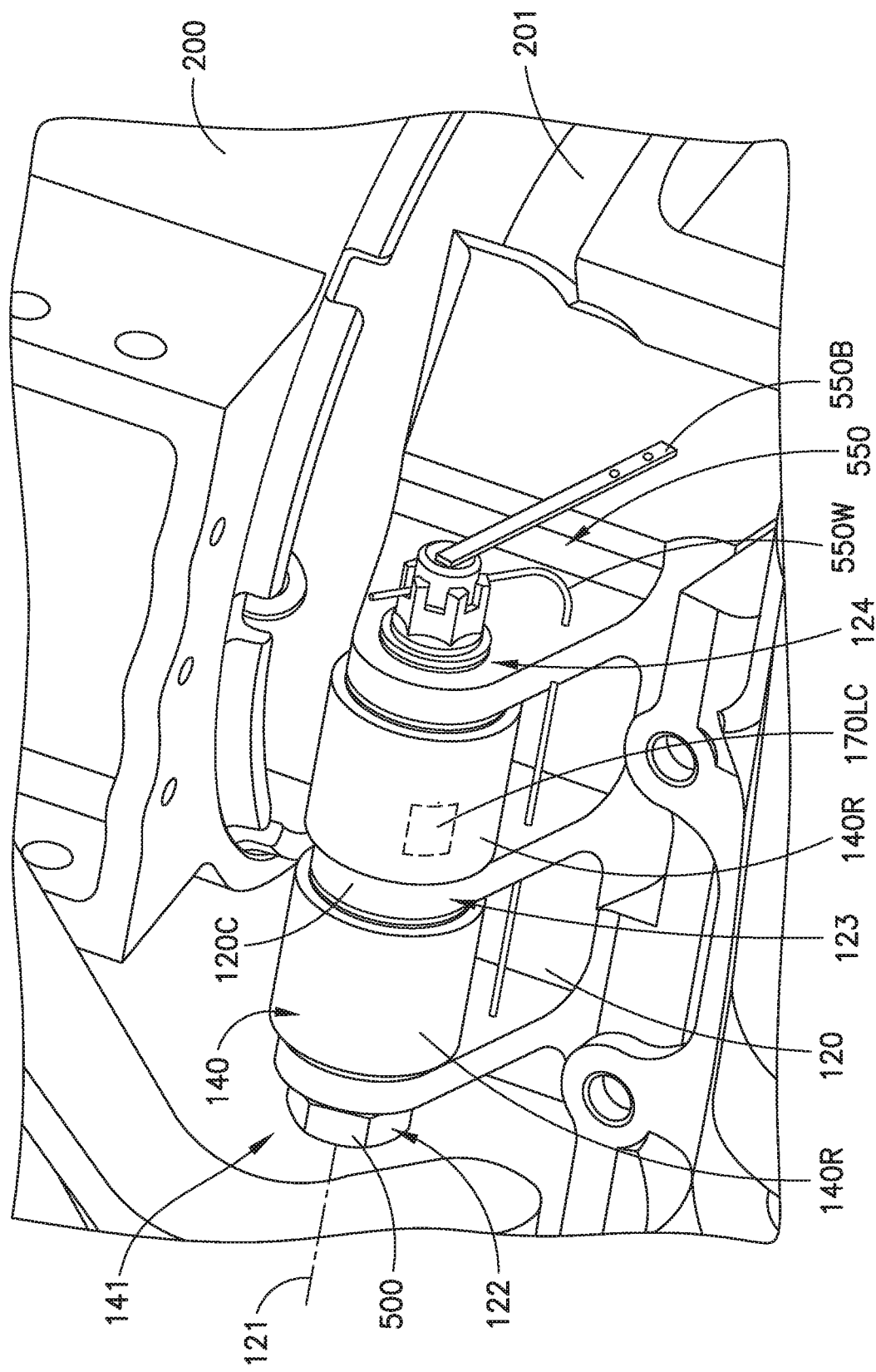
Figure 8:
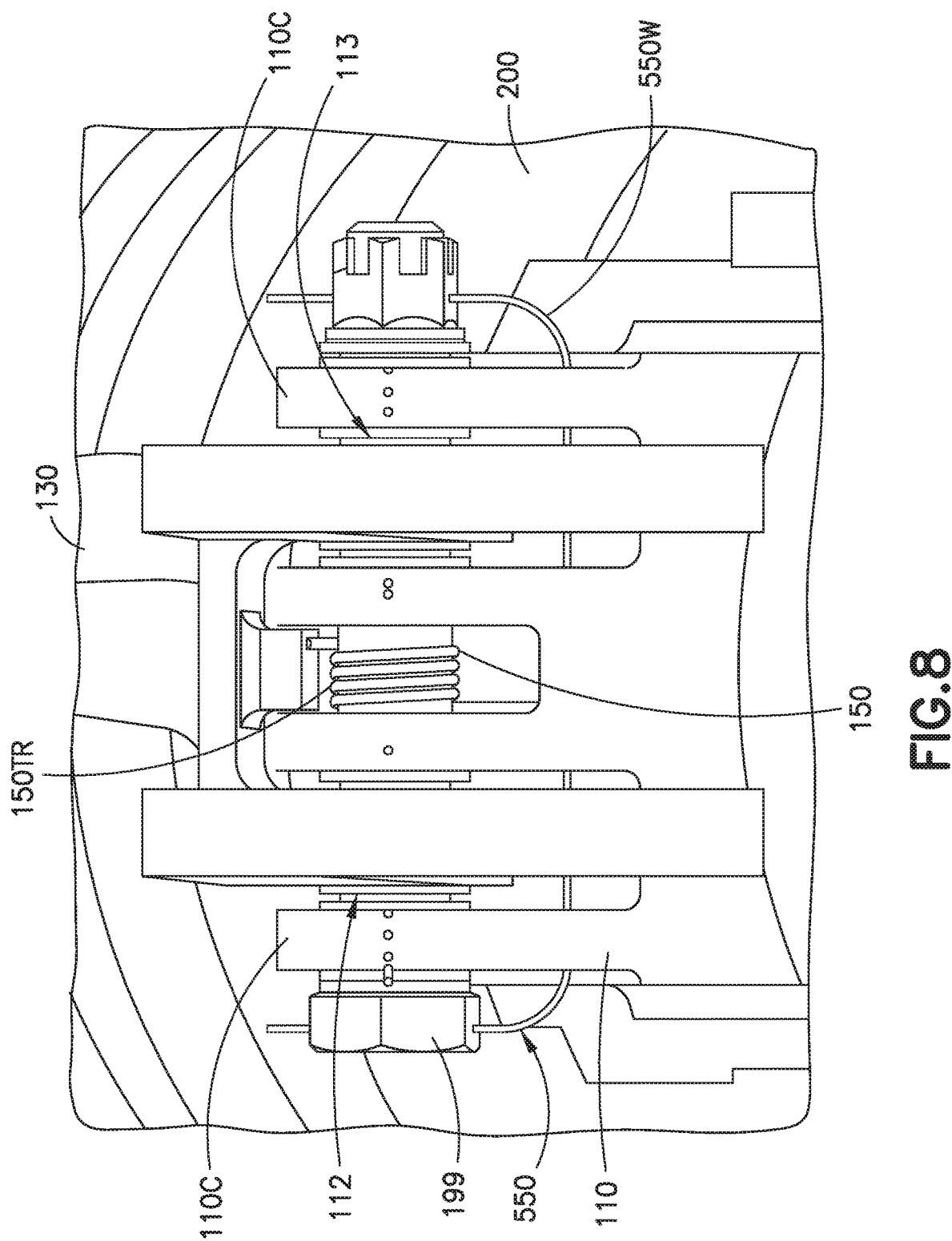
Figure 9:
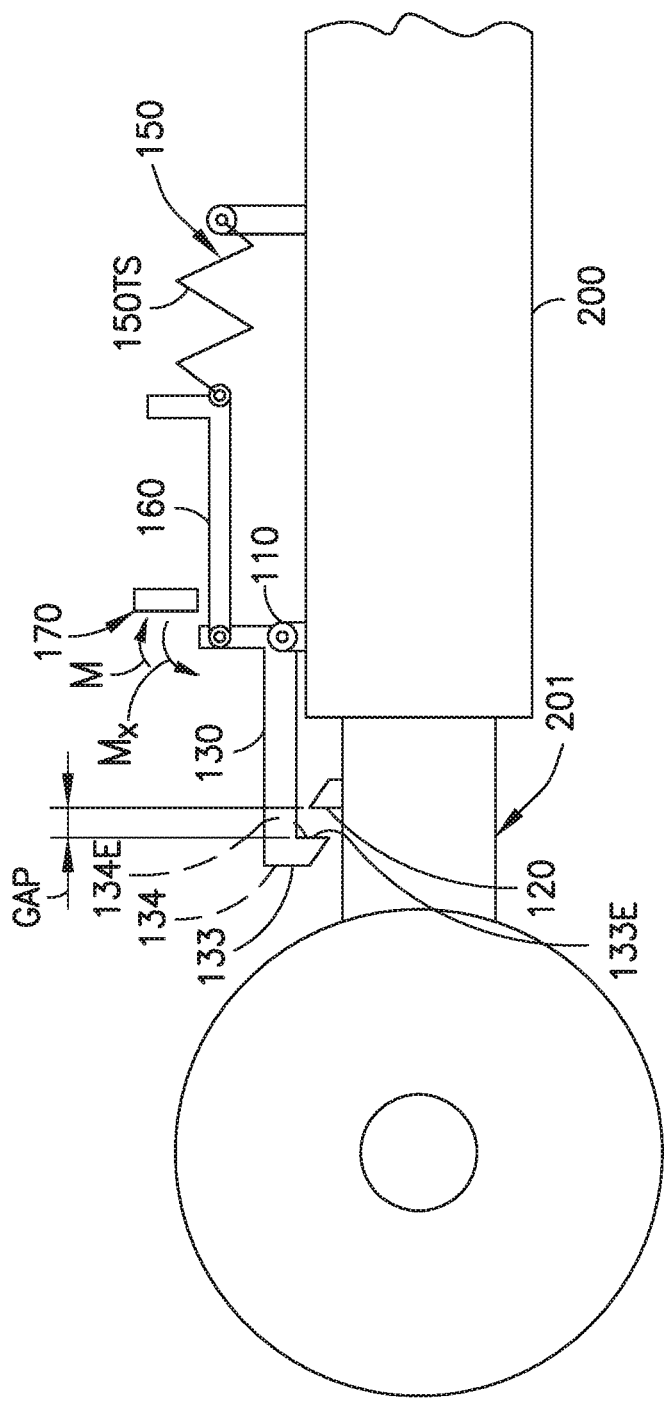
Figure 10:
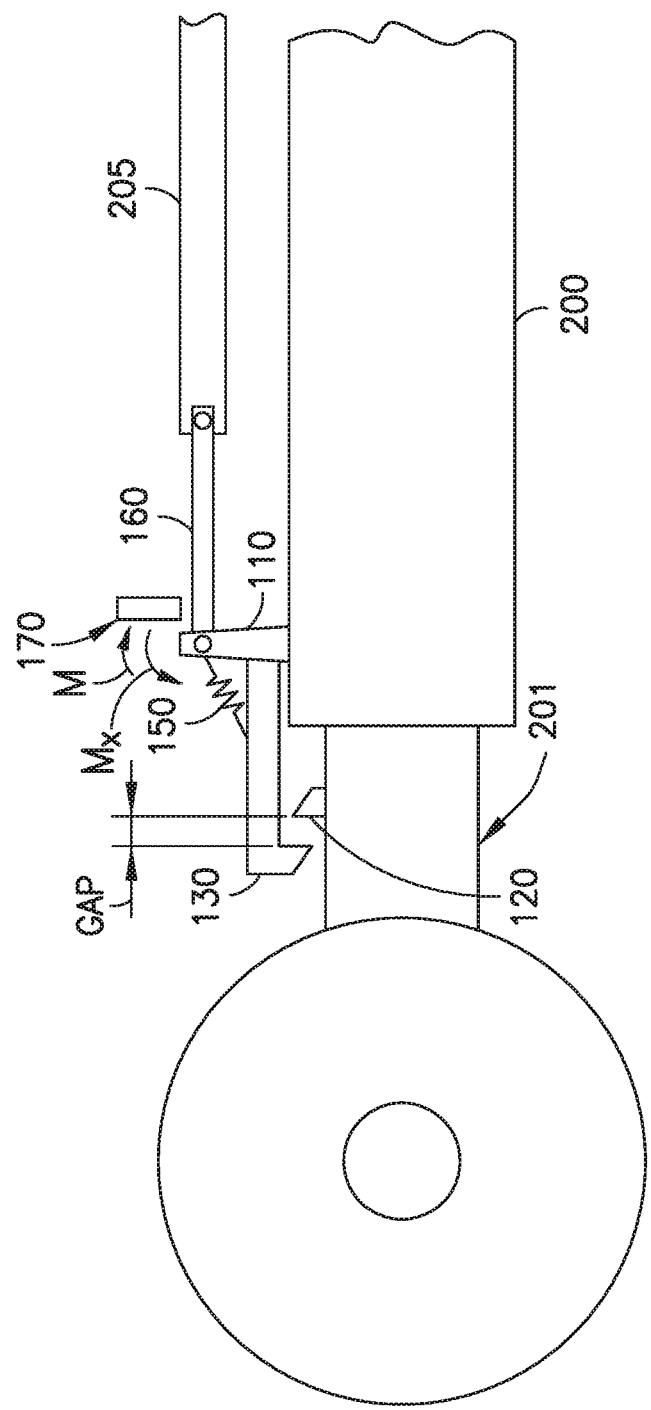
Figure 11:
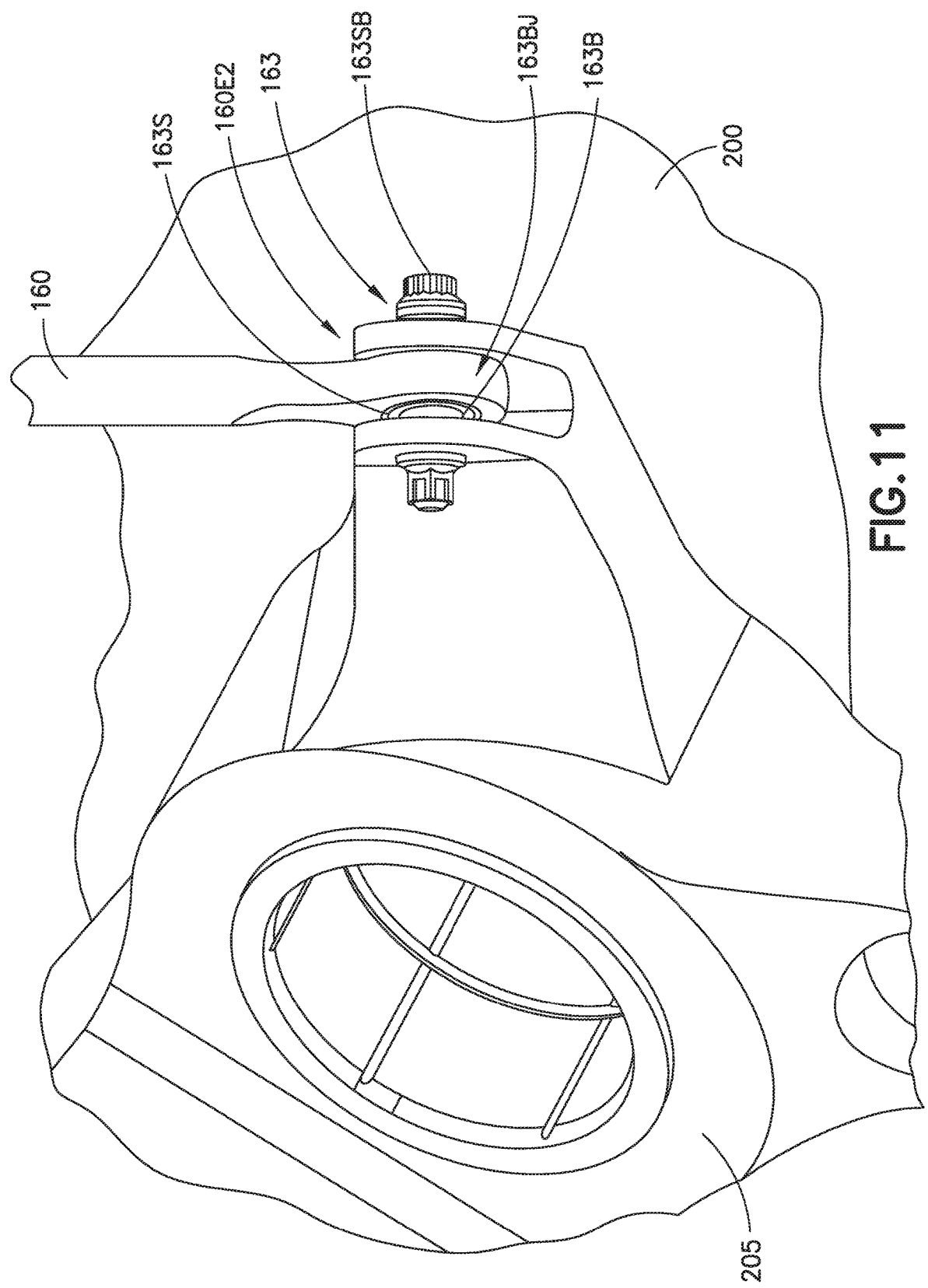
Figure 12:
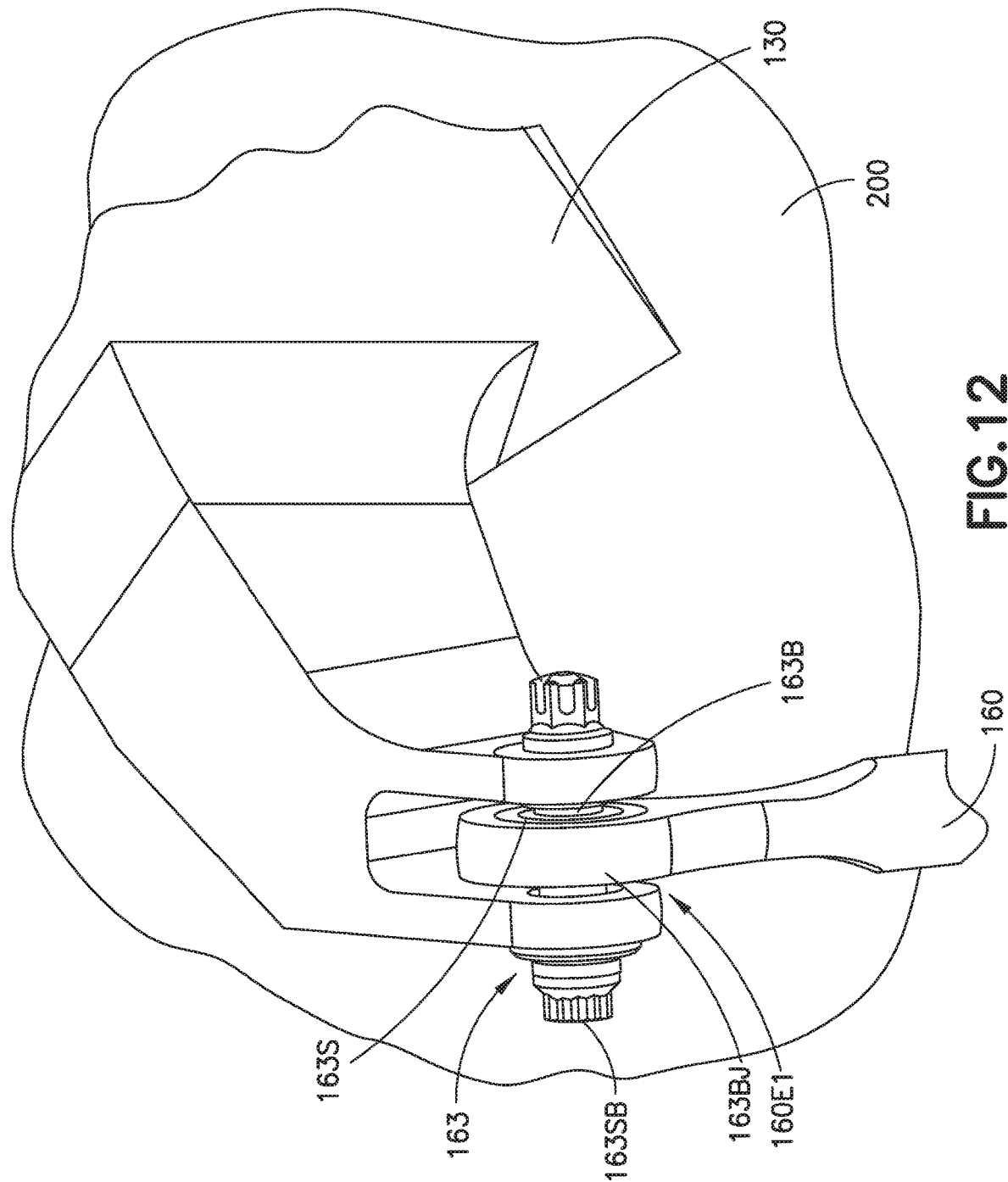
Figure 13:
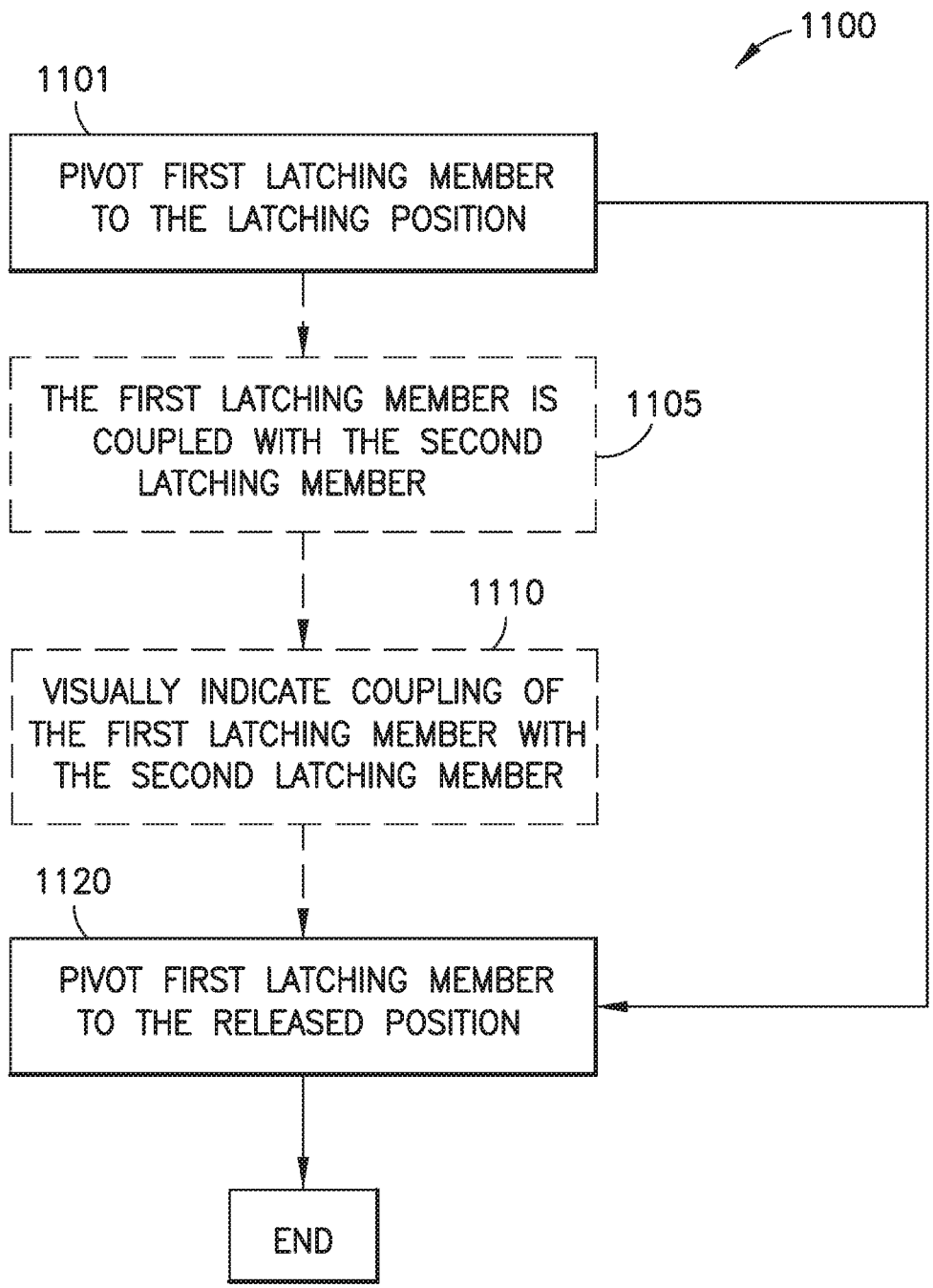

Having thus described examples of the present disclosure in general terms, reference will now be made to the accompanying drawings, which are not necessarily drawn to scale, and wherein like reference characters designate the same or similar parts throughout the several views, and wherein:

FIG. 1 is a schematic illustration of an aircraft in accordance with one or more aspects of the present disclosure;

FIG. 2 is a schematic illustration of a landing gear strut assembly that can be used with the aircraft of FIG. 1 in accordance with one or more aspects of the present disclosure;

FIG. 3 is a perspective view of the landing gear strut assembly of FIG. 2 in accordance with one or more aspects of the present disclosure;

FIG. 4A is a schematic elevation view of the landing gear strut assembly of FIG. 2 in a latching position in accordance with one or more aspects of the present disclosure;

FIG. 4B is a schematic elevation view of the landing gear strut assembly of FIG. 2 in a released position in accordance with one or more aspects of the present disclosure;

FIG. 5 is a perspective view of the landing gear strut assembly of FIG. 2 illustrating another latching mechanism in accordance with one or more aspects of the present disclosure;

FIG. 6 is a perspective view of the landing gear strut assembly of FIG. 2 illustrating yet another latching mechanism in accordance with one or more aspects of the present disclosure;

FIG. 7 is a perspective view of a portion of the landing gear strut assembly of FIG. 2 in accordance with one or more aspects of the present disclosure;

FIG. 8 is a bottom elevation view of a portion of the landing gear strut assembly of FIG. 2 illustrating a biasing mechanism in accordance with one or more aspects of the present disclosure;

FIG. 9 is a schematic side elevation view of the landing gear strut assembly of FIG. 2 illustrating another biasing mechanism in accordance with one or more aspects of the present disclosure;

FIG. 10 is a schematic side elevation view of the landing gear strut assembly of FIG. 2 illustrating still another biasing mechanism in accordance with one or more aspects of the present disclosure;

FIG. 11 is a perspective view of a portion of the landing gear strut assembly of FIG. 2 illustrating a jointed coupling between a landing gear side brace and an actuation rod in accordance with one or more aspects of the present disclosure;

FIG. 12 is a perspective view of a portion of the landing gear strut assembly of FIG. 2 illustrating a jointed coupling between a latching mechanism and the actuation rod shown in FIG. 11 in accordance with one or more aspects of the present disclosure; and FIG. 13 is a flow chart of a method for retaining a telescoping landing gear using the landing gear strut assembly of FIGS. 2-4 in accordance with one or more aspects of the present disclosure.

DETAILED DESCRIPTION

Referring to FIGS. 1-3, at least some landing gears of an aircraft 1000 are designed to extend and retract (i.e., telescoping) to obtain benefits of longer landing gear 1001. Generally, the telescoping landing gear 1001 described herein is design to extend, or lengthen, in direction A as the telescoping landing gear 1001 is deployed (i.e., the landing gear extends in a landing configuration) to obtain benefits such as an increased ride height, take-off height, and aircraft rotation on take-off and/or landing. In order to utilize the same wheel well 1002 dimensions as for a conventional landing gear, the telescoping landing gear 1001 retracts, or shortens, in direction B when stored (i.e., the wheel well 1002 is not reconfigured to accommodate the longer landing gear as the telescoping landing gear 1001 shortens to fit within the same volume as the conventional landing gear).

The apparatus and methods described herein provide for a landing gear strut assembly 100 that includes a latch mechanism 190 that can inhibit extension of the telescoping landing gear 1001 while the telescoping landing gear 1001 is stored within the wheel well 1002 of the aircraft 1000. Accordingly, the aspects of the present disclosure described herein provide for the aircraft 1000 including the latch mechanism 190 integral with the landing gear strut assembly 100 so as to benefit from telescoping landing gear 1001 while also retaining the landing gear 1001 in a shrunken position while stowed within the wheel well 1002 of the aircraft 1000.

The landing gear strut assembly 100 may be employed in one or more of a telescoping main landing gear 1001M, a telescoping nose landing gear 1001N, and/or a telescoping tail landing gear (not shown). While the aspects of the present disclosure are described herein with respect to a fixed wing aircraft, the aspects of the present disclosure may be applied to any suitable vehicle having landing gear, including but not limited to, rotary wing aircraft, space vehicles, etc.

Referring still to FIGS. 1-3, an exemplary landing gear strut assembly 100 is illustrated incorporating aspects of the present disclosure. In one aspect, the landing gear strut assembly 100 is rotatably coupled to a frame 1000F of the aircraft 1000 in any suitable manner, such as about a trunnion axis of rotation 100AX (see FIG. 2). The landing gear strut assembly 100 includes an outer cylinder 200 and an inner cylinder 201. The outer cylinder 200 may be rotatably coupled to the frame 1000F at the trunnion axis of rotation 100AX, and the inner cylinder 201 is configured to reciprocate within the outer cylinder 200. The landing gear strut assembly 100 also includes the latch mechanism 190. The latch mechanism 190 includes a first mounting bracket 110, a second mounting bracket 120, a first latching member 130 coupled to the first mounting bracket 110, and a second latching member 140 coupled to the second mounting bracket 120. The latch mechanism 190 may also include one or more of a biasing member 150 (FIGS. 8-10), at least one actuation rod 160, and a sensor 170 (FIGS. 7 and 9-10).

In one aspect, the first mounting bracket 110 is coupled to the outer cylinder 200 of the landing gear strut assembly 100 in any suitable manner so as to extend from the outer cylinder 200 of the landing gear strut assembly 100. For example, in one aspect, the first mounting bracket 110 is integrally formed with the outer cylinder 200 such that the first mounting bracket 110 and the outer cylinder 200 form a unitary one piece member (e.g., machined from a single piece of material, cast as a one piece member, etc.). In another aspect, the first mounting bracket 110 is welded, bolted, etc. to the outer cylinder 200.

In one aspect, the first mounting bracket 110 forms at least one clevis 110C including one or more attachment points 112, 113. The one or more attachment points 112, 113 are configured to rotatably couple the first latching member 130 to the first mounting bracket 110. In one aspect, the one or more attachment points 112, 113 are aligned such that a common axis 111 of the first mounting bracket 110 extends through the one or more attachment points 112, 113.

Referring to FIGS. 1-3 and 4A-4B, the first latching member 130 includes a first end 131 and a second end 132 spaced apart from one another by any suitable distance 130D. The first end 131 of the first latching member 130 is pivotally coupled to the first mounting bracket 110 such that the common axis 111 extends through the first end 131. For example, any suitable fastener 199 may extend along the common axis 111, through the first end 131 of the first latching member 130 and through the first mounting bracket 110, such that the fastener 199 pivotally couples the first latching member 130 to the first mounting bracket 110. In one aspect, the fastener 199 may be a bolt and nut or any other suitable fastener (or number of fasteners) configured to form a pivotal coupling between the first latching member 130 and the first mounting bracket 110.

The first latching member 130, when coupled to the first mounting bracket 110, is configured to pivot relative to the outer cylinder 200 in direction P about the common axis 111. Pivoting the first latching member 130 relative to the outer cylinder 200 causes the first latching member 130 to pivot between a latching position LP (shown in FIG. 4A) and a released position RP (shown in FIG. 4B). As described herein, pivoting the first latching member 130 to the latching position LP causes the second end 132 of the first latching member 130 to be positioned relative to the second latching member 140 so that the second end 132 is placed within a path of travel TP of the second latching member 140 as the inner cylinder 201 extends in the direction DE to lengthen the telescoping landing gear 1001. Positioning the first latching member 130 to be relative to the second latching member 140 mechanically retains extension of the inner cylinder 201 and prevents the inner cylinder 201 from extending in the direction DE relative to the outer cylinder 200. When in the released position RP, the second end 132 of the first latching member 130 is positioned away from the path of travel TP so that the second end 132 does not interfere/engage with second latching member 140 (e.g., is uncoupled from the second latching member 140) and the inner cylinder 201 is free to extend or move in the direction DE relative to the outer cylinder 200.

In one aspect, referring to FIGS. 3-5 and 11-12, pivoting of the first latching member 130 between the latching position LP and the released position RP is slaved to a side brace 205 of the telescoping landing gear 1001 by the at least one actuation rod 160. In one aspect, the at least one actuation rod 160 is coupled to both the first latching member 130 and the side brace 205 of the landing gear strut assembly 100. In one aspect, the at least one actuation rod 160 has a first end 160E1 coupled to the first latching member 130 and a second end 160E2 coupled to the side brace 205. For example, the first end 160E1 of the at least one actuation rod 160 is pivotally coupled to side brace 205 at pivotal coupling 205C. The second end 160E2 of the at least one actuation rod 160 is pivotally coupled to the first latching member 130 at pivotal coupling 135C. The pivotal couplings 205C, 135C may be ball joints or any other suitable couplings that allow for non-binding movement between the at least one actuation rod 160 and one or more of the side brace 205 and the first latching member 130.

In one aspect, such as where the first latch 133 and the second latch 134 are independently pivotable about the common axis 111, the at least one actuation rod 160 includes two actuation rods 160A, 160B (FIG. 5) coupled to the first latch 133 and the second latch 134 respectively. The two actuation rods 160A, 160B are coupled to the side brace 205 and the respective one of the first latch 133 and the second latch 134 such that the first latch 133 and the second latch 134 rotate independently of one another (i.e., the first and second latches 133, 134 are both slaved to the side brace 205 but are not directly coupled to each other and rotate independent from one another).

As the side brace 205 rotates relative to the outer cylinder 200 when the telescoping landing gear 1001 is retracted into the wheel well 1002, the first latching member 130 is pivoted by the at least one actuation rod 160 from the released position RP to the latching position LP to mechanically retain the inner cylinder 201. As the side brace 205 rotates relative to the outer cylinder 200 as the telescoping landing gear 1001 is deployed from the wheel well 1002, the first latching member 130 is pivoted by the at least one actuation rod 160 from the latching position LP to the released position RP.

Referring to FIGS. 3-6, in one aspect, the first latching member 130 includes a first latch 133 and a second latch 134, wherein each of the first latch 133 and the second latch 134 is configured to carry an entire extension load of the landing gear strut assembly 100. In one aspect, the first latch 133 and the second latch 134 rotate about the common axis 111 of the first mounting bracket 110.

In one aspect, the first latching member 130 includes a common base 135 (FIG. 3) from which the first latch 133 and the second latch 134 extend. The first end 131 is defined by the common base 135. The common base 135 may be configured to extend into the clevis 110C so as to be positioned at the one or more attachment points 112, 113 where the common axis 111 extends through the common base 135 at the one or more attachment points 112, 113. The common base 135 may include the pivotal coupling 135C to which the at least actuation rod 160 is coupled.

In another aspect, the first latch 133 and the second latch 134 are configured to rotate independent of one another (see FIG. 5). For example, each of the first latch 133 and the second latch 134 may be coupled to the side brace 205 by a respective actuation rod 160A, 160B so that both the first latch 133 and the second latch 134 are independently slaved to the side brace 205 of the landing gear strut assembly 100. In this aspect, each of the first latch 133 and the second latch 134 has a first end 131 including the pivotal coupling 135C. The fastener 199 may extend through the first mounting bracket 110 and the respective first ends 131 of the first latch 133 and the second latch 134 for pivotally coupling the first latch 133 and the second latch 134 to a respective attachment point 112, 113 of the first mounting bracket 110 (e.g., the common axis 111 extends through both the first latch 133 and the second latch 134).

Referring to FIGS. 3, 5, and 7, in one aspect, the second mounting bracket 120 is coupled to the inner cylinder 201 of the landing gear strut assembly 100 in any suitable manner so as to extend from the inner cylinder 201. For example, in one aspect, the second mounting bracket 120 is integrally formed with the inner cylinder 201 such that the second mounting bracket 120 and the inner cylinder 201 form a unitary one piece member (e.g., machined from a single piece of material, cast as a one piece member, etc.). In another aspect, the second mounting bracket 120 is welded, bolted, etc. to the inner cylinder 201.

In one aspect, the second mounting bracket 120 forms at least one clevis 120C including one or more attachment points 122, 123, 124. The one or more attachment points 122, 123, 124 are configured to couple the second latching member 140 to the second mounting bracket 120. In one aspect, the one or more attachment points 122, 123, 124 are aligned such that a second mounting bracket common axis 121 extends through the one or more attachment points 122, 123, 124.

Still referring to FIGS. 3, 5, and 7, in one aspect, the second latching member 140 includes at least one roller 140R (FIG. 7) coupled to the at least one clevis 120C. For example, one of the at least one roller 140R may be disposed between attachment points 122, 123 and another of the at least one roller 140R may be disposed between attachment points 123, 124. The at least one roller 140R is coupled to the at least one clevis 120C with any suitable coupling member 141 that allows for rotation of the at least one roller 140R relative to the clevis 120C. In one aspect, the coupling member 141 is one or more fasteners 500 (e.g., such as one or more bolts and corresponding nuts). In another aspect, the latching member may be integrally formed (e.g., a lip or other engagement surface configured couple with the second end 132 of the first latching member 130) with the clevis 120C. In still other aspects, the second latching member 140 may be one or more rods extending through the clevis (in a manner similar to the way the fastener extends through the clevis along the common axis 121) where the one or more rods is configured to couple with a respective one of the first latch 133 and the second latch 134 at the second end 132 of the first latching member 130.

Referring to FIGS. 7 and 8, in one aspect, the landing gear strut assembly 100 includes any suitable fastener retention mechanism(s) 550 for retaining one or more of the fasteners 199, 500 in a respective one of the first mounting bracket 110 and the second mounting bracket 120. The fastener retention mechanism(s) 550 may be any suitable bracket 550B (FIG. 7), wire 550W (FIGS. 7 and 8), pin or other retention mechanism that either extends through or is positioned adjacent to a respective end of the fastener 199, 500 for coupling the fastener 199, 500 to the respective first mounting bracket 110 and second mounting bracket 120, e.g., so as to retain the fastener 199, 500. In other aspects, the landing gear strut assembly 100 may not have the fastener retention mechanism 550.

Referring to FIGS. 4A, 9 and 10, while in the latching position LP, the second end 132 of the first latching member 130 is positioned relative to the second latching member 140 so as to couple with the second latching member 140 and retain the inner cylinder 201 in a retracted position. The first latching member 130 may be positioned relative to the second latching member 140 so that the first latching member 130 is unloaded (i.e., a gap GAP exists between the first latching member 130 and the second latching member 140). For example, the gap GAP may exist between the at least one roller 140R and a respective engagement surface 133E, 134E of the first latch 133 and the second latch 134. The latch mechanism 190 is configured so that the gap GAP exists under normal telescoping landing gear operation (where "normal" telescoping landing gear operation is, i.e., when the inner cylinder 201 is held in a retracted position within the outer cylinder 200 by landing gear hydraulics or other landing gear shortening mechanisms while the landing gear is stowed). In one aspect, the first latching member 130 couples with the second latching member 140 under abnormal telescoping landing gear operation (where "abnormal" telescoping landing gear operation is, i.e., when the inner cylinder 201 is unintentionally lengthened or extended while stowed in the wheel well 1002 (the landing gear extends while stowed)) to retain the inner cylinder 201 in the retracted position. For example, upon abnormal telescoping landing gear operation the engagement surface 133E, 134E of the first latch 133 and the second latch 134 couple with the second mounting bracket 120 (such as with the one or more rollers 140R) to retain the telescoping landing gear 1001 in a shortened configuration.

Referring now to FIGS. 3, 4A, 4B, and 8-10, as noted above, in one aspect, the latch mechanism 190 further includes any suitable biasing member 150 configured to bias the first latching member 130 in the released position RP. In one aspect, the biasing member 150 is a torsion spring 150TR (FIG. 8) that is disposed between the first mounting bracket 110 and the first latching member 130. The torsion spring 150TR may cause a biasing moment between the first mounting bracket 110 and the first latching member 130 about the common axis 111 so as to bias the first latching member 130 in the released position RP. In another aspect, the biasing member 150 is a tension spring 150TS (FIGS. 9 and 10) coupled to both the first latching member 130 and one or more of the outer cylinder 200 (FIG. 9) and the at least one actuation rod 160 (FIG. 10). It should be understood that the biasing member 150 may be any suitable biasing member(s) (e.g., tension spring(s), compression spring(s), or torsion spring(s)) that applies a linear or rotational biasing force, e.g., moment M to bias the first latching member 130 in the released position RP.

Generally, the biasing member 150 is in a relaxed state when the first latching member 130 is in the released position RP. In one aspect, as the telescoping landing gear 1001 is stowed in the wheel well 1002 (FIGS. 1 and 2), the side brace 205 causes a moment MX to be exerted on the first latching member 130 so that the first latching member 130 is pivoted about common axis 111 to the latching position LP. When the moment MX exerted on the first latching member 130 is released, such as upon unintentional extension of the telescoping landing gear 1001, the moment M exerted by the biasing member 150 may bias the first latching member 130 to the released position RP.

For example, the at least one actuation rod 160 may be coupled to one or more of the side brace 205 and the first latching member 130 by at least one frangible coupling 163 (e.g., one or more of the pivotal couplings 135C, 205C may be the frangible coupling 163). The frangible coupling 163 may be any suitable coupling that is configured to decouple (e.g., to release the moment MX) when a predetermined force (such as an extension force/load of the telescoping landing gear 1001) is applied to the frangible coupling 163. In one aspect, as shown in FIGS. 11 and 12, the frangible coupling 163 includes a ball joint 163BJ that has ball 163B coupled to a respective one of the side brace 205 and first latching member 130 by a shear bolt 163SB. The frangible coupling 163 also includes a socket 163S coupled to a respective end 160E1, 160E2 of the at least one actuation rod 160 where the socket 163S is pivotally coupled to the ball 163B to provide pivotal movement between the at least one actuation rod 160 and one or more of the side brace 205 and the first latching member 130. In other aspects the frangible coupling 163 may be any other suitable frangible coupling. The at least one frangible coupling 163 is configured to decouple upon coupling of the first latching member 130 with the second latching member 140 under the influence of the extension force of the landing gear strut assembly 100.

The at least one frangible coupling 163 is configured so that the at least one actuation rod 160 decouples from the one or more of the side brace 205 and the first latching member 130 so as to provide an operator/technician of the aircraft 1000 a visual indication that the landing gear 1001 unintentionally extended while stowed within the wheel well 1002. For example, if the at least one frangible coupling 163 decouples so that the at least one actuation rod 160 decouples from the one or more of the side brace 205 and the first latching member 130, the at least one actuation rod 160 may hangs down from, for example, the first latching member 130 or the side brace 205 providing a visual indicator of abnormal telescoping landing gear 1001 operation.

Referring now to FIGS. 9 and 10, in one aspect, the landing gear strut assembly 100 may include the sensor 170 where the sensor 170 is configured for sensing engagement of the first latching member 130 with the second latching member 140. In one aspect, the sensor 170 is a proximity sensor disposed on one or more of the first latching member 130 and the second latching member 140 so as to detect the presence of the other one of the first latching member 130 and the second latching member 140. Upon detecting the presence of the other one of the first latching member 130 and the second latching member 140, a signal may be transmitted from the sensor 170 to the operator of the aircraft 1000 (e.g., such as through a graphical user interface or other indicator in the cockpit) or to another remote location to indicate that the inner cylinder 201 extended and the first latching member 130 is coupled with the second latching member 140. In another aspect, the sensor 170 is a load cell 170LC (FIG. 7) disposed on one or more of the second latching member 140 and the first latching member 130. In this aspect, if the first latching member 130 couples with the second latching member 140, a force is applied to the load cell by the first latching member 130 and an electrical signal is created by the load cell which, in turn, may be transmitted to the operator of the aircraft 1000 or to another remote location in a manner substantially similar to that described above with respect to the proximity sensor.

Referring now to FIGS. 1, 2, 3, 4A, 4B, 9, 10, and 13, a method 1100 of retaining a telescoping landing gear 1001 that includes the outer cylinder 200 and the inner cylinder 201 will be described. In one aspect, while the telescoping landing gear 1001 is in an un-stowed configuration (i.e., extended outside of the wheel well 1002 for landing, take-off, taxiing and other suitable ground operations), the first latching member 130 is positioned in the released position RP (FIG. 4B). The telescoping landing gear 1001 is stowed within the wheel well 1002 after take-off by actuating any suitable landing gear stowage mechanism LGS (FIG. 2). The first latching member 130, which is slaved to the side brace 205 as described above, is pivoted in direction P to the latching position LP (FIG. 4A) relative to the second latching member 140 (FIG. 13, Block 1101) (e.g., the at least one actuation rod 160 moves the first latching member from the released position RP to the latching position LP).

In the event of an abnormal operation of the telescoping landing gear 1001 while stowed within the wheel well 1002 (i.e., the inner cylinder 201 extends in the direction DE) the first latching member 130, positioned within the path of travel TP of the second latching member 140, couples with the second latching member 140 and retains or otherwise stops extension of the inner cylinder 201 in direction DE (FIG. 13, Block 1105). Where the first latching member 130 couples with the second latching member 140, the at least one actuating rod 160 decouples from one or more of the side brace 205 and the first latching member 130 to provide the visual indication of the first latching member 130 coupling with the second latching member 140 (FIG. 13, Block 1110) (e.g., the at least one actuating rod 160 hangs down to indicate that the at least one actuating rod 160 separated from the side brace 205 or the first latching member 130).

In one aspect, where the sensor 170 is provided, the sensor 170 senses the coupling of the first latching member 130 with the second latching member 140 and effects the visual indication, such as through a graphical user interface or other indicator within the cockpit of the aircraft 1000, to the operator of the aircraft 1000 or any suitable technician that the first latching member 130 and the second latching member 140 coupled (FIG. 13, Block 1110). This indicator informs the operator and/or technician that the telescoping landing gear 1001 extended while stowed within the wheel well 1002.

Upon deployment/un-stowing of the telescoping landing gear 1001 from the wheel well 1002 of the aircraft 1000, the first latching member 130 pivots to the released position so that the inner cylinder 201 is free to move relative to the outer cylinder 200 in a direction DE of extension (FIG. 13, Block 1120). For example, where the telescoping landing gear 1001 operates normally within the wheel well 1002, the first latching member 130 passively pivots, under the influence of the at least one actuation rod 160 and side brace 205, to the released position RP upon un-stowing of the telescoping landing gear 1001 from the wheel well 1002. Where the telescoping landing gear 1001 operates abnormally (e.g., is extended while stowed) and the first latching member 130 is coupled with the second latching member 140, the first latching member 130 and the second latching member 140 are configured to decouple from one another under the biasing force provided by the biasing member 150 (FIGS. 8, 9, and 10). For example, upon touchdown of the aircraft 1000 on, e.g., a runway or landing strip, the telescoping landing gear 1001 is compressed under at least the weight of the aircraft 1000. This compression of the telescoping landing gear 1001 causes a gap that is similar to the gap GAP (FIGS. 4A, 9, and 10) to form between the first latching member 130 and the second latching member 140. The formation of the gap GAP upon compression of the telescoping landing gear 1001 allows the biasing member 150 to pivot the first latching member 130 about the common axis 111 from the latching position LP to the released position RP so that the inner cylinder 201 is free to move (e.g., reciprocate) relative to the outer cylinder 200. The release of the first latching member 130 from the second latching member 140 and the subsequent reciprocating movement of the inner cylinder 201 relative to the outer cylinder 200 ends the method.

The following are provided in accordance with the aspects of the present disclosure:

A1. A landing gear strut assembly comprising:
an outer cylinder;
an inner cylinder that reciprocates within the outer cylinder; and
a latch mechanism including
a first mounting bracket coupled to the outer cylinder of the landing gear strut assembly;
a second mounting bracket coupled to the inner cylinder;
a first latching member pivotally coupled to the first mounting bracket, the first latching member having a latching position and a released position; and
a second latching member coupled to the second mounting bracket,
wherein the latching position the first latching member is positioned relative to the second latching member so as to couple with the second latching member and retain the inner cylinder in a retracted position, relative to the outer cylinder, in a direction of extension of the inner cylinder, and
wherein the released position the first latching member is uncoupled from the second latching member so that the inner cylinder is free to move relative to the outer cylinder in the direction of extension of the inner cylinder.

A2. The landing gear strut assembly of paragraph A1, wherein the latch mechanism further comprises a biasing member configured to bias the first latching member in the released position.

A3. The landing gear strut assembly of paragraph A2, wherein the biasing member is a torsion spring.

A4. The landing gear strut assembly of paragraph A2, wherein the biasing member is a tension spring coupled to both the first latching member and the outer cylinder.

A5. The landing gear strut assembly of paragraphs A1 to A4, wherein the first latching member is unloaded under normal telescoping landing gear operation.

A6. The landing gear strut assembly of paragraphs A1 to A5, wherein the first latching member couples with the second latching member under abnormal telescoping landing gear operation.

A7. The landing gear strut assembly of paragraphs A1 to A6, wherein the latch mechanism further comprises a sensor configured for sensing engagement of the first latching member with the second latching member.

A8. The landing gear strut assembly of paragraph A7, wherein the sensor is a proximity sensor.

A9. The landing gear strut assembly of paragraph A7, wherein the sensor is a load cell on the second latching member.

A10. The landing gear strut assembly of paragraphs A1 to A9, wherein the first latching member includes a first latch and a second latch, wherein each of the first latch and the second latch is configured to carry an entire extension load of the landing gear strut assembly.

A11. The landing gear strut assembly of paragraph A10, wherein the first latching member further includes a common base, where the first latch and the second latch extend from the common base.

A12. The landing gear strut assembly of paragraph A10 to A11, wherein the first latch and the second latch rotate about a common axis of the first mounting bracket.

A13. The landing gear strut assembly of paragraph A10 to A12, wherein the first latch and the second latch are coupled to at least one actuation rod such that the first latch and the second latch rotate independently of one another.

A14. The landing gear strut assembly of paragraph A1 to A13, wherein the latch mechanism further comprises at least one actuation rod coupled to both the first latching member and a side brace of the landing gear strut assembly.

A15. The landing gear strut assembly of paragraph A14, wherein the actuation of the first latching member is slaved to the side brace by the at least one actuation rod to extend and retract the first latching member between the latching position and the released position.

A16. The landing gear strut assembly of paragraph A14 to A15, wherein the at least one actuation rod includes at least one frangible coupling configured to couple the at least one actuation rod to one or more of the side brace and/or the first latching member.

A17. The landing gear strut assembly of paragraph A14 to A16, wherein the frangible coupling is a shear bolt.

A18. The landing gear strut assembly of paragraph A1 to A17, wherein the second mounting bracket comprises at least one clevis.

A19. The landing gear strut assembly of paragraph A18, wherein the second latching member comprises at least one roller coupled to the at least one clevis.

A20. The landing gear strut assembly of paragraph A19, wherein the at least one roller is coupled to the at least one clevis with a coupling member.

A21. The landing gear strut assembly of paragraph A20, wherein the coupling member is a bolt.

A22. The landing gear strut assembly of paragraph A20 to A21, wherein the second latching member further comprises a bracket configured to retain the coupling member in the at least one clevis.

B1. An aircraft comprising:
a frame, and
a landing gear strut assembly rotatably coupled to the frame, the landing gear strut assembly including:
an outer cylinder;
an inner cylinder that reciprocates within the outer cylinder; and
a latch mechanism including:
a first mounting bracket coupled to the outer cylinder of the landing gear strut assembly;
a second mounting bracket coupled to the inner cylinder;
a first latching member pivotally coupled to the first mounting bracket, the first latching member having a latching position and a released position; and
a second latching member coupled to the second mounting bracket, wherein the latching position the first latching member is positioned relative to the second latching member so as to couple with the second latching member and retain the inner cylinder in a retracted position, relative to the outer cylinder, in a direction of extension of the inner cylinder, and wherein the released position the first latching member is uncoupled from the second latching member so that the inner cylinder is free to move relative to the outer cylinder in the direction of extension of the inner cylinder.

B2. The aircraft of paragraph B1, wherein the latch mechanism further comprises a biasing member configured to bias the first latching member in the released position.

B3. The aircraft of paragraph B2, wherein the biasing member is a torsion spring.

B4. The aircraft of paragraph B2, wherein the biasing member is a tension spring coupled to both the first latching member and the outer cylinder.

B5. The aircraft of paragraph B1 to B4, wherein the first latching member is unloaded under normal telescoping landing gear operation.

B6. The aircraft of paragraph B1 to B5, wherein the first latching member couples with the second latching member under abnormal telescoping landing gear operation to retain the inner cylinder in the retracted position.

B7. The aircraft of paragraph B1 to B6, wherein the latch mechanism further comprises a sensor configured for sensing engagement of the first latching member with the second latching member.

B8. The aircraft of paragraph B7, wherein the sensor is a proximity sensor.

B9. The aircraft of paragraph B7, wherein the sensor is a load cell on the second latching member.

B10. The aircraft of paragraph B1 to B9, wherein the first latching member includes a first latch and a second latch, wherein each of the first latch and the second latch is configured to carry an entire extension load of the landing gear strut assembly.

B11. The aircraft of paragraph B10, wherein the first latching member further includes a common base, where the first latch and the second latch extend from the common base.

B12. The aircraft of paragraph B10 to B11, wherein the first latch and the second latch rotate about a common axis of the first mounting bracket.

B13. The aircraft of paragraph B10 to B12, wherein the first latch and the second latch are coupled to at least one actuation rod such that the first latch and the second latch rotate independent of one another.

B14. The aircraft of paragraph B1 to B13, wherein the latch mechanism further comprises at least one actuation rod coupled to both the first latching member and a side brace of the landing gear strut assembly.

B15. The aircraft of paragraph B14, wherein the actuation of the first latching member is slaved to the side brace by the at least one actuation rod to extend and retract the first latching member between the latching position and the released position.

B16. The aircraft of paragraph B14 to B15, wherein the at least one actuation rod includes at least one frangible coupling configured to couple the at least one actuation rod to one or more of the side brace and/or the first latching member.

B17. The aircraft of paragraph B14 to B16, wherein the frangible coupling is a shear bolt.

B18. The aircraft of paragraph B1 to B17, wherein the second mounting bracket comprises at least one clevis.

B19. The aircraft of paragraph B18, wherein the second latching member comprises at least one roller coupled to the at least one clevis.

B20. The aircraft of paragraph B19, wherein the at least one roller is coupled to the at least one clevis with a coupling member.

B21. The aircraft of paragraph B20, wherein the coupling member is a bolt.

B22. The aircraft of paragraph B20 to B21, wherein the second latching member further comprises a bracket configured to retain the coupling member in the at least one clevis.

C1. A method of retaining a telescoping landing gear that includes an outer cylinder, an inner cylinder that reciprocates within the outer cylinder, and a latch mechanism, the method comprising:

positioning a first latching member of the latch mechanism in a latching position relative to a second latching member of the latch mechanism so as to couple with the second latching member and retain extension of the inner cylinder relative to the outer cylinder upon abnormal actuation of the telescoping landing gear, where the first latching member is pivotally coupled to the outer cylinder and the second latching member is coupled to the inner cylinder; and positioning the first latching member in a released position upon extension of the telescoping landing gear from a wheel well of an aircraft, where in the released position the first latching member is uncoupled from the second latching member so that the inner cylinder is free to move relative to the outer cylinder in a direction of extension and retraction of the telescoping landing gear.

C2. The method of paragraph C1, wherein the first latching member and the second latching member are coupled upon abnormal operation of the telescoping landing gear.

C3. The method of paragraph C2, further comprising biasing the first latching member so that coupling of the first and the second latching members is released by compressing the telescoping landing gear so that bias of the first latching member moves the first latching member to the released position.

C4. The method of paragraph C1 to C3, further comprising moving the first latching member between the released position and the latching position with at least one actuation rod.

C5. The method of paragraph C4, further comprising visually indicating, with the at least one actuating rod, the first latching member coupling with the second latching member.

C6. The method of paragraph C4 to C5, further comprising visually indicating coupling of the first latching member to the second latching member, where one end of the actuation rod separates from a side brace of the telescoping landing gear.

C7. The method of paragraph C1 to C6, further comprising sensing, with a sensor, coupling of the first latching member with the second latching member.

C8. The method of paragraph C1 to C7, wherein the first latching member is spaced from the second latching member upon normal operation of the telescoping landing gear.

In the figures, referred to above, solid lines, if any, connecting various elements and/or components may represent mechanical, electrical, fluid, optical, electromagnetic, wireless and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the drawings may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in the figures, may be combined in various ways without the need to include other features described in the figures, other drawing figures, and/or the accompanying disclosure, even though such combination or combinations are not explicitly illustrated herein. Similarly, additional features not limited to the examples presented, may be combined with some or all of the features shown and described herein.

In FIG. 13, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIG. 13 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or substantially simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first", "second", etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A landing gear strut assembly comprising:
   an outer cylinder comprising:
      a first end forming a trunnion axis about which the outer cylinder is pivotally coupled to a vehicle frame; and
      a second end, longitudinally spaced from the first end;
   an inner cylinder that extends from the second end of the outer cylinder, the inner cylinder reciprocates within the outer cylinder; and
   a latch mechanism comprising:
      a first mounting bracket coupled to the outer cylinder of the landing gear strut assembly adjacent to the second end of the outer cylinder;
      a second mounting bracket coupled to the inner cylinder;
      a first latching member pivotally coupled to the first mounting bracket, the first latching member having a latching position and a released position; and
      a second latching member coupled to the second mounting bracket so that the second latching member reciprocates along a linear path of travel defined by reciprocating movement of the inner cylinder,
   wherein in the latching position the first latching member is positioned relative to the second latching member so as to block the linear path of travel of the second latching member, couple with the second latching member and retain the inner cylinder in a retracted position, relative to the outer cylinder, in a direction of extension of the inner cylinder, and
   wherein in the released position the first latching member is uncoupled from the second latching member so that the inner cylinder is free to move relative to the outer cylinder in the direction of extension of the inner cylinder.

2. The landing gear strut assembly of claim 1, further comprising a biasing member configured to bias the first latching member in the released position.

3. The landing gear strut assembly of claim 1, further comprising a sensor configured for sensing engagement of the first latching member with the second latching member.

4. The landing gear strut assembly of claim 1, wherein the first latching member includes a first latch and a second latch, wherein each of the first latch and the second latch is configured to carry an entire extension load of the landing gear strut assembly.

5. The landing gear strut assembly of claim 4, wherein the first latching member further includes a common base, where the first latch and the second latch extend from the common base.

6. The landing gear strut assembly of claim 4, wherein the first latch and the second latch rotate about a common axis of the first mounting bracket.

7. The landing gear strut assembly of claim 4, wherein the first latch and the second latch are coupled to at least one actuation rod such that the first latch and the second latch rotate independently of one another.

8. The landing gear strut assembly of claim 1, wherein the second mounting bracket comprises at least one clevis.

9. The landing gear strut assembly of claim 8, wherein the second latching member comprises at least one roller coupled to the at least one clevis.

10. An aircraft comprising:
    a frame; and
    a landing gear strut assembly rotatably coupled to the frame, the landing gear strut assembly comprising:
       an outer cylinder comprising:
          a first end forming a trunnion axis about which the outer cylinder is pivotally coupled to the frame; and
          a second end, longitudinally spaced from the first end;
       an inner cylinder that extends from the second end of the outer cylinder, the inner cylinder reciprocates within the outer cylinder; and
       a latch mechanism comprising:
          a first mounting bracket coupled to the outer cylinder of the landing gear strut assembly adjacent to the second end of the outer cylinder;
          a second mounting bracket coupled to the inner cylinder;
          a first latching member pivotally coupled to the first mounting bracket, the first latching member having a latching position and a released position; and a second latching member coupled to the second mounting bracket so that the second latching member reciprocates along a linear path of travel defined by reciprocating movement of the inner cylinder, wherein in the latching position the first latching member is positioned relative to the second latching member so as to block the linear path of travel of the second latching member, couple with the second latching member and retain the inner cylinder in a retracted position, relative to the outer cylinder, in a direction of extension of the inner cylinder, and wherein in the released position the first latching member is uncoupled from the second latching member so that the inner cylinder is free to move relative to the outer cylinder in the direction of extension of the inner cylinder.

11. The aircraft of claim 10, wherein the first latching member is unloaded under normal telescoping landing gear operation.

12. The aircraft of claim 10, wherein the first latching member couples with the second latching member under abnormal telescoping landing gear operation to retain the inner cylinder in the retracted position.

13. The aircraft of claim 10, further comprising at least one actuation rod coupled to both the first latching member and a side brace of the landing gear strut assembly.

14. The aircraft of claim 13, wherein actuation of the first latching member is slaved to the side brace by the at least one actuation rod to extend and retract the first latching member between the latching position and the released position.

15. The aircraft of claim 13, wherein the at least one actuation rod includes at least one frangible coupling configured to couple the at least one actuation rod to at least one of the side brace and the first latching member.

16. A method of retaining a telescoping landing gear that includes an outer cylinder, an inner cylinder that reciprocates within the outer cylinder, and a latch mechanism, the method comprising:

positioning a first latching member of the latch mechanism in a latching position relative to a second latching member of the latch mechanism so as to block a linear path of travel of the second latching member, couple with the second latching member, and retain extension of the inner cylinder relative to the outer cylinder upon abnormal actuation of the telescoping landing gear, where:

the linear path of travel of the second latching member is defined by reciprocating movement of the inner cylinder, and the outer cylinder comprises:

a first end that forms a trunnion axis bout which the outer cylinder is pivotally coupled to a vehicle frame; and a second end, longitudinally spaced from the first end, where the first latching member is pivotally coupled to the outer cylinder adjacent the second end and the second latching member is coupled to the inner cylinder; and positioning the first latching member in a released position upon extension of the telescoping landing gear from a wheel well of an aircraft, where in the released position the first latching member is uncoupled from the second latching member so that the inner cylinder is free to move relative to the outer cylinder in a direction of extension and retraction of the telescoping landing gear.

17. The method of claim 16, wherein the first latching member and the second latching member are coupled upon the abnormal actuation of the telescoping landing gear.

18. The method of claim 17, further comprising biasing the first latching member so that coupling of the first latching member and the second latching member is released by compressing the telescoping landing gear so that bias of the first latching member moves the first latching member to the released position.

19. The method of claim 16, further comprising moving the first latching member between the released position and the latching position with at least one actuation rod.

20. The method of claim 19, further comprising visually indicating, with the at least one actuating rod, the first latching member coupling with the second latching member.

* * * * *